(12) United States Patent
Liu et al.

(10) Patent No.: US 11,774,818 B2
(45) Date of Patent: Oct. 3, 2023

(54) DISPLAY PANEL AND ELECTRONIC APPARATUS

(71) Applicants: Hefei BOE Optoelectronics Technology Co., Ltd., Anhui (CN); BOE TECHNOLOGY GROUP CO., LTD., Beijing (CN)

(72) Inventors: Zhaofan Liu, Beijing (CN); Xianxue Duan, Beijing (CN); Zhihai Zhang, Beijing (CN)

(73) Assignees: HEFEI BOE OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/801,833

(22) PCT Filed: Oct. 12, 2021

(86) PCT No.: PCT/CN2021/123181
§ 371 (c)(1),
(2) Date: Aug. 24, 2022

(87) PCT Pub. No.: WO2022/100335
PCT Pub. Date: May 19, 2022

(65) Prior Publication Data
US 2023/0079331 A1 Mar. 16, 2023

(30) Foreign Application Priority Data
Nov. 10, 2020 (CN) .......................... 202011252036.0

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC ..................................................... G02F 1/1362
See application file for complete search history.

(56) References Cited

U.S. PATENT DOCUMENTS

| | | | |
|---|---|---|---|
| 10,008,613 | B2 | 6/2018 | Wang |
| 10,230,004 | B2 | 3/2019 | Wang |

(Continued)

FOREIGN PATENT DOCUMENTS

| | | | |
|---|---|---|---|
| CN | 103064223 | A | 4/2013 |
| CN | 103412427 | A | 11/2013 |

(Continued)

*Primary Examiner* — Sang V Nguyen
(74) *Attorney, Agent, or Firm* — Westman, Champlin & Koehler, P.A.

(57) ABSTRACT

A display substrate including: a base substrate, wherein at least one bonding element to be electrically connected to an external component is disposed in a peripheral region of the base substrate. The bonding element includes a first conductive layer, a second conductive layer and an insulation layer. The first conductive layer includes a metal oxide conductive lead. The second conductive layer includes a metal conductive lead. One or more via holes are provided in a region of the insulation layer. The metal conductive lead is electrically connected to the metal oxide conductive lead through the one or more via holes. The bonding element further comprises a via hole protection layer. A reflective liquid crystal display panel and an electrical apparatus are provided.

18 Claims, 7 Drawing Sheets

(56) References Cited

U.S. PATENT DOCUMENTS

| | | | |
|---|---|---|---|
| 10,444,579 B2 | 10/2019 | Wang et al. | |
| 2016/0048045 A1* | 2/2016 | Imai | G02F 1/1337 430/315 |
| 2016/0336461 A1 | 11/2016 | Wang | |
| 2017/0288005 A1* | 10/2017 | Kawata | H01L 27/1218 |
| 2018/0108722 A1* | 4/2018 | Nishikawa | H10K 59/131 |
| 2018/0269334 A1 | 9/2018 | Wang | |
| 2019/0094598 A1* | 3/2019 | Wang | G02F 1/13458 |
| 2019/0271878 A1* | 9/2019 | Tsuruda | G02F 1/133514 |
| 2021/0124226 A1* | 4/2021 | Cheng | H01L 21/48 |
| 2021/0210527 A1* | 7/2021 | Bai | H01L 27/124 |
| 2021/0233939 A1 | 7/2021 | Wang et al. | |
| 2021/0343769 A1 | 11/2021 | Ban et al. | |
| 2022/0059639 A1 | 2/2022 | Zhang et al. | |

FOREIGN PATENT DOCUMENTS

| | | |
|---|---|---|
| CN | 104752439 A | 7/2015 |
| CN | 104779200 A | 7/2015 |
| CN | 104882487 A | 9/2015 |
| CN | 106876411 A | 6/2017 |
| CN | 106941093 A | 7/2017 |
| CN | 109884830 A | 6/2019 |
| CN | 110412790 A | 11/2019 |
| CN | 110660814 A | 1/2020 |
| CN | 110718563 A | 1/2020 |
| CN | 112255849 A | 1/2021 |
| CN | 213182261 U | 5/2021 |

\* cited by examiner

A-A

B-B

DISPLAY PANEL AND ELECTRONIC APPARATUS

CROSS REFERENCE TO RELATED APPLICATION(S)

This application is a Section 371 National Stage Application of International Application No. PCT/CN2021/123181, filed on Oct. 12, 2021, entitled "DISPLAY PANEL AND ELECTRONIC APPARATUS", which published as WIPO Publication No. 2022/100335, on May 19, 2022, not in English, which claims priority to Chinese Patent Application No. 202011252036.0, filed on Nov. 10, 2020, the disclosures of which are incorporated herein by reference in their entireties.

TECHNICAL FIELD

The present disclosure relates to a field of display technology, particularly to a display substrate and an electronic apparatus.

BACKGROUND

Thin film transistor liquid crystal display apparatus has been widely used in a field of display apparatus due to its small size and low power consumption. A transmissive liquid crystal display panel and a reflective liquid crystal display panel are two common types of liquid crystal display panels. The reflective liquid crystal display panel may reflect a light entering a display panel and use it as a light source for displaying an image in order to realize a display function. Accordingly, a special backlight source may be omitted, thereby reducing power consumption. The reflective liquid crystal display panel is applicable for an e-book, an outdoor advertisement and the like. In the reflective liquid crystal display panel, a bonding region may be disposed in a peripheral region, in order to be electrically connected to an external component.

SUMMARY

An embodiment of the present disclosure provides a display substrate, including a base substrate, the base substrate including a display region and a peripheral region surrounding the display region, wherein at least one bonding element configured to be electrically connected to an external component is disposed in the peripheral region, the bonding element includes a first conductive layer, and the first conductive layer includes a metal oxide conductive lead. The bonding element further includes a second conductive layer located between the first conductive layer and the base substrate, and the second conductive layer includes a metal conductive lead. The bonding element further includes an insulation layer located between the second conductive layer and the first conductive layer, wherein one or more via holes are provided in a region of the insulation layer corresponding to at least one metal oxide conductive lead, the at least one metal oxide conductive lead includes a part located on the insulation layer in contact with the insulation layer and a part extending into the via hole in the insulation layer. The metal conductive lead and the metal oxide conductive lead are connected in one-to-one correspondence, and the metal conductive lead is electrically connected to the metal oxide conductive lead through the one or more via holes. The bonding element further includes a via hole protection layer disposed on a region of the metal oxide conductive lead corresponding to the via hole.

In some embodiments of the present disclosure, in a same bonding element, an area of an orthographic projection of the via hole protection layer on the base substrate is less than an area of an orthographic projection of a surface, which is not covered by the via hole protection layer, of the first conductive layer on the base substrate, and the surface, which is not covered by the via hole protection layer, of the first conductive layer is a contact surface to be electrically connected to the external component.

In some embodiments of the present disclosure, the via hole protection layer includes at least one metal layer, the display substrate further includes a reflection electrode located in the display region, and a material of the reflection electrode is the same as a material of the at least one metal layer.

In some embodiments of the present disclosure, the at least one metal layer is a metal double layer, the metal double layer includes a metal adhesion layer and a metal reflection layer which are laminated, and the metal reflection layer is used for reflection.

In some embodiments of the present disclosure, a plurality of sub-pixel units are disposed in the display region, a pixel electrode layer is disposed in each sub-pixel unit, the pixel electrode layer is disposed on a side of the reflection electrode facing to the base substrate and is electrically connected to the pixel electrode, an orthographic projection of the pixel electrode layer on the base substrate has a block shape, and in a same sub-pixel unit in the display region, a minimum distance between an edge of an orthographic projection of the reflection electrode on the base substrate and an edge of an orthographic projection of the pixel electrode layer on the base substrate is less than 10 μm.

In some embodiments of the present disclosure, a plurality of data lines and a plurality of gate lines are disposed in the display region, the plurality of data lines intersect with the plurality of gate lines, a distance between an orthographic projection of an edge of the reflection electrode in the sub-pixel unit in the display region on the base substrate and an orthographic projection of the data line closest to the reflection electrode on the base substrate is less than 8 μm.

In some embodiments of the present disclosure, an orthographic projection of the via hole on the base substrate falls within an orthographic projection of the via hole protection layer on the base substrate, and a minimum distance between an outer edge of the orthographic projection of the via hole on the base substrate and an outer edge of the orthographic projection of the via hole protection layer on the base substrate is less than 15 μm.

In some embodiments of the present disclosure, a gate layer and a source and drain layer are disposed in the display region, the gate layer includes a gate of a thin film transistor, the source and drain layer includes a source of the thin film transistor and a drain of the thin film transistor, and a material of the second conductive layer is the same as a material of the source and drain layer in the display region or a material of the gate layer in the display region.

In some embodiments of the present disclosure, a gate layer and a source and drain layer are disposed in the display region, the gate layer includes a gate of a thin film transistor, the source and drain layer includes a source of the thin film transistor and a drain of the thin film transistor, the at least one bonding element includes a first set of bonding elements in which a material of the second conductive layer is the same as a material of the source and drain layer in the display region, and a second set of bonding elements in which the material of the second conductive layer is the same as a material of the gate layer in the display region, and the first set of bonding elements and the second set of bonding elements are alternately arranged in the peripheral region.

In some embodiments of the present disclosure, a slope angle of the via hole in the first set of bonding elements is large than a slope angle of the via hole in the second set of bonding elements.

In some embodiments of the present disclosure, the slope angle of the via hole in the first set of bonding elements is in a range of 20 degrees to 80 degrees, and the slope angle of the via hole in the second set of bonding elements is in a range of 10 degrees to 60 degrees.

In some embodiments of the present disclosure, the via hole has a circular shape, and the via hole protection layer has a circular shape; and the via hole protection layer and the via hole are not concentric circles.

In some embodiments of the present disclosure, the display substrate is a reflective display substrate; the display region of the display substrate includes a pixel electrode, a metal reflection electrode located on the pixel electrode and a transistor located in the display region, wherein the transistor includes a gate, a gate insulation layer, a source and a drain;

the second conductive layer in the peripheral region includes a gate lead for the gate and a source lead for the source;

the first conductive layer in the peripheral region includes a transparent metal oxide layer, a material of the transparent metal oxide layer is the same as a material of the pixel electrode, and the transparent metal oxide layer is formed by the same process as the pixel electrode;

the insulation layer disposed between the transparent metal oxide layer and the gate lead or the source lead includes the gate insulation layer; the via hole is disposed in the gate insulation layer; the gate lead or the source lead is connected to the transparent metal oxide layer through the via hole;

the gate lead or the source lead is a metal lead;

a metal via hole protection layer having the same material as the metal reflection electrode is formed by the transparent metal oxide layer in the bonding element region, corresponding to a region where the via hole of the gate insulation layer is located.

The embodiment of the present disclosure provides an apparatus of display, wherein includes a display substrate of any one of the embodiments.

BRIEF DESCRIPTION OF THE DRAWINGS

In order to illustrate the technical solutions of the embodiments of the present disclosure more clearly, the accompanying drawings of the embodiments will be briefly described below. It should be understood that the drawings described below only relate to some embodiments of the present disclosure and do not constitute a limitation to the present disclosure, and wherein.

DETAILED DESCRIPTION OF EMBODIMENTS

In order to illustrate the objectives, technical solutions and advantages of the present disclosure more clearly, the preferred embodiments of the present disclosure will be fully described with reference to the drawings. It should be understood that the following description of the embodiments is intended to explain and illustrate a general concept of the present disclosure, and do not constitute a limitation to the present disclosure. In the specification and drawings, the same or similar reference numbers refer to the same or similar parts or components. For the purpose of clarity, the drawings are not necessarily to scale and some well-known components and structures may be omitted from the drawings.

Unless otherwise defined, technical or scientific terms used in the present disclosure may have the ordinary meanings as understood by one of ordinary skill in the art to which the present disclosure belongs. As used in the present disclosure, "first", "second", and similar terms do not denote any order, quantity, or importance, but are merely used to distinguish the various components. The word "a" or "an" does not exclude a plurality. The word "comprises" or "comprising" and similar words mean that the elements or things appearing before the word encompass the elements or things recited after the word and their equivalents, but do not exclude other elements or things. The word "connect" or "connected" is not limited to a physical connection or a mechanical connection, but may include an electrical connection, whether directly or indirectly. The word "Up", "down", "left", "right", "top" or "bottom" is only used to indicate a relative positional relationship. When an absolute position of the described object changes, the relative positional relationship may also correspond to change. When an element such as a layer, film, region or substrate is referred to as being located "on" or "under" another element, it can be "directly" "on" or "under" another element, or an intermediate element may exist.

Figure 1:
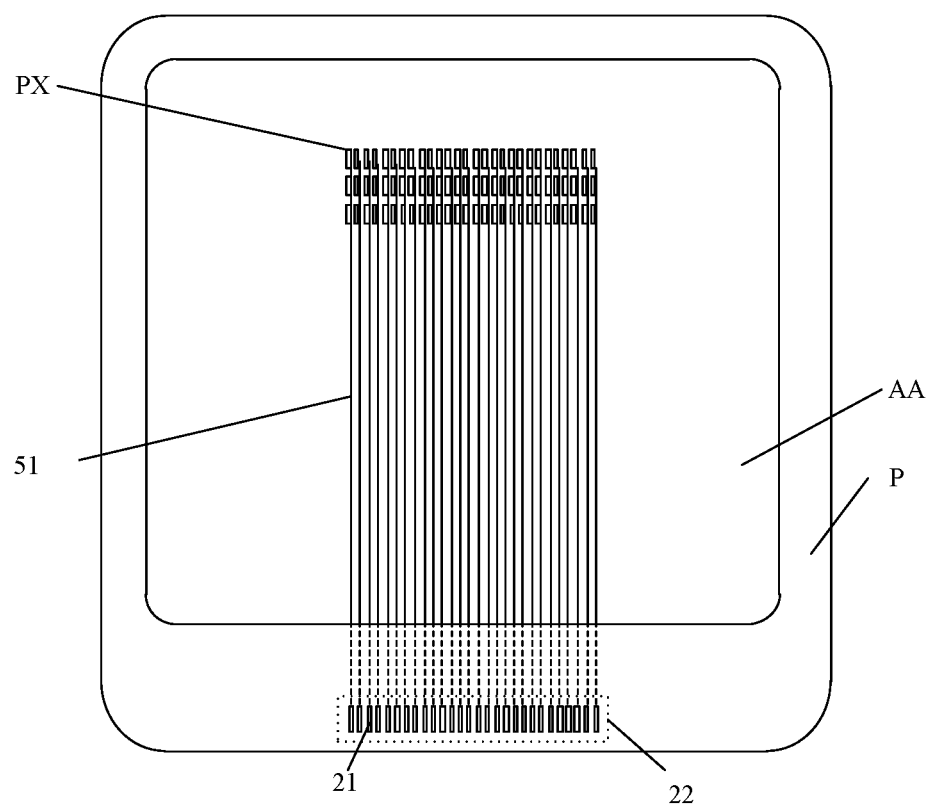
FIG. 1 shows a schematic diagram of a display substrate according to some embodiments of the present disclosure.
Figure 2:
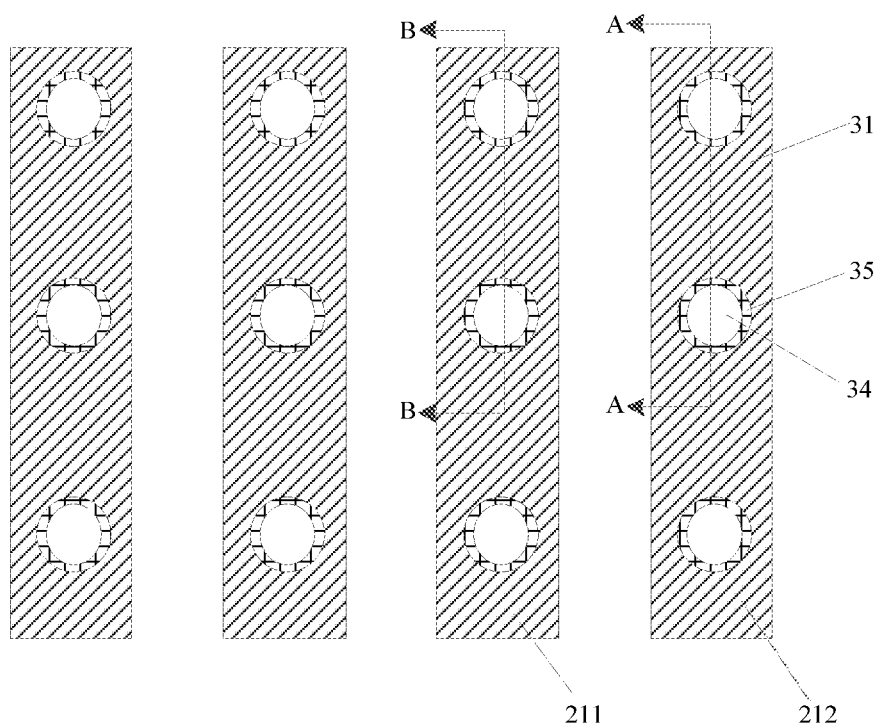
FIG. 2 shows a schematic top view of a bonding element in a peripheral region of a display substrate according to some embodiments of the present disclosure.

A reflective liquid crystal display panel may generally include an array substrate (a display substrate), a color film substrate, and a liquid crystal layer sandwiched between the display substrate and the color film substrate. FIG. 1 shows a schematic diagram of a display substrate 100 used for a reflective liquid crystal display panel. The display substrate 100 may be an array substrate, for instance. The display substrate 100 may include a base substrate 10. A display region AA and a peripheral region P are arranged on the base substrate 10. The peripheral region P is disposed surrounding the display region AA. A plurality of sub-pixels PX and a plurality of data lines 51 may be provided in the display region AA. One or more bonding elements 21 configured to be electrically connected to an external component (e.g., a flexible circuit board, an external integrated circuit board, etc.) are disposed in the peripheral region 20. The bonding element 21 may include a pad, for instance. As an example, some of the bonding elements 21 may be directly or indirectly connected to the plurality of data lines 51 or a plurality of gate lines mentioned above. Certainly, the bonding element 21 is not limited to transmit signals for the data lines 51. The bonding element 21 may also transmit any other signals required for the operation of the display panel. A region of a plurality of peripheral areas 20 where the bonding elements 21 are arranged may also be referred as a "bonding region" 22. FIG. 2 shows an example of a layout of the bonding elements 21. As shown in FIG. 2 in combination with FIG. 3, the bonding element 21 may include a first conductive layer 31, a second conductive layer 32 located between the first conductive layer 31 and the base substrate 10, and an insulation layer 33 located between the second conductive layer 32 and the first conductive layer 31. The first conductive layer 31 may be formed of, for example, a metal oxide (e.g. indium tin oxide (ITO)). The first conductive layer 31 may include a metal oxide conductive lead. The second conductive layer 32 may include a metal conductive lead. The insulation layer 33 may be, for example, a passivation layer which may isolate the first conductive layer 31 from the second conductive layer 32. The second conductive layer 32 may be electrically connected to the first conductive layer 31 through, for example, a via hole 34 penetrating the insulation layer 33. Specifically, in some embodiments of the present disclosure, one or more via holes 34 are provided in a region of the insulation layer 33 corresponding to at least one metal oxide conductive lead. Each metal oxide conductive lead includes a part located on the insulation layer in contact with the insulation layer and a part extending into the via hole 34 in the insulation layer 33. The metal conductive lead and the metal oxide conductive lead are connected in one-to-one correspondence, and the metal conductive lead is electrically connected to the metal oxide conductive lead through the one or more via holes 34. The bonding elements 21 may further include a via hole protection layer 35, and the via hole protection layer 35 is disposed on a region of the metal oxide conductive lead corresponding to the via hole 34. The via hole protection layer 35 may be disposed on a side of the first conductive layer 31 away from the base substrate 10 and the via hole protection layer 35 covers the via hole 34. As an example, the first conductive layer 31 has a non-covered surface 36. The non-covered surface 36 is not covered by the via hole protection layer 35. The non-covered surface 36 can be used as a contact surface to be electrically connected to the external component.

Figure 7:
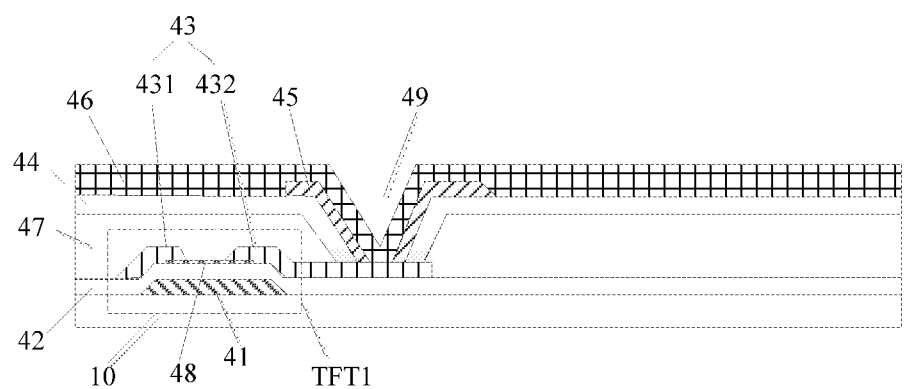
FIG. 7 shows a schematic cross-sectional view of the sub-pixel unit in the display substrate according to some embodiments of the present disclosure.

For simplifying the process, each of the first conductive layer 31, the second conductive layer 32 and the insulation layer 33 may be arranged in the same layer as some layer structure in the display region AA of the display substrate, that is being formed of a same material and formed by a same process. In some embodiments of the present disclosure, as shown in FIG. 7, a gate layer 41, a gate insulation layer 42, a source and drain layer 43, a passivation layer 44, a pixel electrode layer 45 and a reflection layer 46 are provided on the base substrate 10 in the display region AA of the display substrate. The gate insulation layer 42 is arranged on a side of the gate layer 41 away from the base substrate 10, the source and drain layer 43 is arranged on a side of the gate insulation layer 42 away from the base substrate 10, the passivation layer 44 is arranged on a side of the source and drain layer 43 away from the base substrate 10, the pixel electrode layer 45 is arranged on a side of the passivation layer 44 away from the base substrate 10, and the reflection layer 46 is arranged on a side of the pixel electrode layer 45 away from the base substrate 10. The reflection layer 46 covers the pixel electrode layer 45. The gate layer 41 may include a gate of the thin film transistor TFT1. The source and drain layer 43 may include a source 431 and a drain 432 of the thin film transistor TFT1. In some embodiments of the present disclosure, the first conductive layer 31 and the pixel electrode layer 45 may be formed of the same material and formed by the same process. It should be noted that FIG. 7 shows only an example, in which the thin film transistor TFT1 has a bottom-gate type structure. However, the embodiments of the present disclosure are not limited thereto. For example, the thin film transistor TFT1 may has a top-gate type structure. In case that the thin film transistor having the top-gate type structure is used in the display substrate, the gate layer 41 is disposed on a side of the source and drain layer 43 away from the base substrate 10.

A reflection electrode 46 is further provided on a side of the pixel electrode layer 45 away from the base substrate 10 in the layer structure of the display substrate. Accordingly, in manufacturing the bonding elements 21, a material of the reflection electrode 46 on a side of the first conductive layer 31 away from the base substrate 10 needs to be etched away, so as to expose at least a part of an outer surface of the first conductive layer 31 in order to be electrically connected to the external component. However, if the material of the reflection electrode 46 on a side of the first conductive layer 31 away from the base substrate 10 is completely etched away, the etching solution may etches to the second conductive layer 32 through the via hole 34. The first conductive layer 31 is used to receive an electrical signal from the external component, and the second conductive layer 32 is used to transmit the electrical signal received from the first conductive layer 31 to the display region. Therefore, once the second conductive layer 32 is damaged, a transmission of electrical signal may be unstable or even interrupted, thereby affecting a stability of screen display seriously. In the embodiment of the present disclosure, the via hole 34 is covered by the via hole protection layer 35, so as to prevent the second conductive layer 32 from being damaged by the etching solution. As an example, the via hole protection layer 35 may be formed of the same material and formed by the same process as the reflection electrode 46. The material of the reflection electrode 46 may be usually composed of aluminum or aluminum-molybdenum laminated layer, and aluminum may be oxidized at a high temperature, causing a decrease in conductivity. Accordingly, if the via hole protection layer 35 completely covers a surface of the first conductive layer 31, the via hole protection layer 35 may be oxidized (a bonding operation may be performed at a high temperature) and thus a signal transmission may be affected. Therefore, in the embodiment of the present disclosure, the via hole protection layer 35 covers the via hole 34, but does not completely cover the metal oxide conductive lead in the first conductive layer 31. In this way, the second conductive layer 32 may be prevented from being damaged by the etching solution, while the contact surface of the first conductive layer 31 may be exposed to ensure a stable transmission of the electrical signal.

Figure 11:
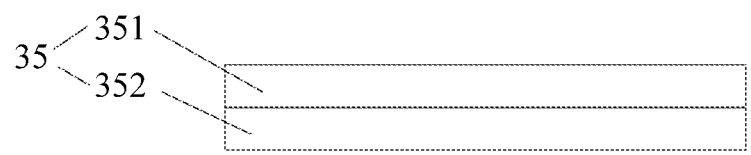
FIG. 11 shows an exemplary structure of a via hole protection layer.

In some embodiments of the present disclosure, as shown in FIG. 11, the via hole protection layer 35 may include at least one metal layer. As an example, the at least one metal layer may be a metal double layer. The metal double layer includes a metal adhesion layer 352 and a metal reflection layer 351 which are laminated, and the metal reflection layer is used for reflection. The metal reflection layer 351 may be made of aluminum or aluminum-neodymium alloy, for example. The metal adhesion layer 352 may be made of molybdenum, for example. This structure is beneficial for implementing the reflection electrode 46 in the display region AA. Such a structure facilitates forming the via hole protection layer 35 and the reflection electrode 46 by the same process. That is, the material of the reflection electrode 46 is the same as the material of the via hole protection layer 35 in the display substrate. In addition, such a structure may also block the etching solution to protect the via hole 34. As another example, the at least one metal layer may include only one metal layer (e.g., an aluminum layer), for instance.

In the embodiment of the present disclosure, each of the via hole protection layer 35 and the reflection electrode 46 may be made of, for example, an aluminum layer, a laminated layer of aluminum and molybdenum, or a laminated layer of aluminum-neodymium alloy and molybdenum.

Figure 3:
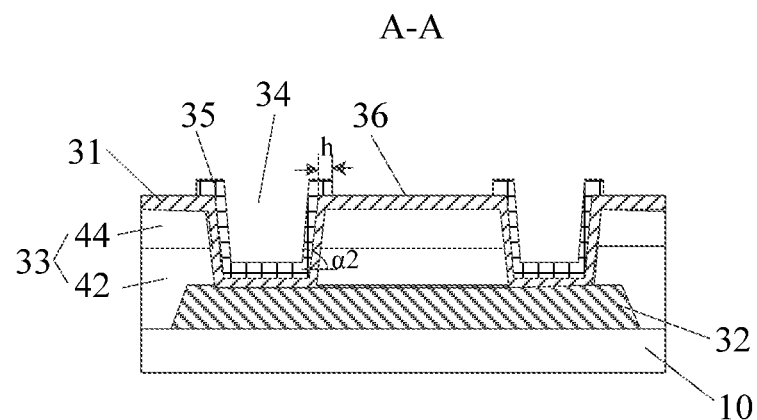
FIG. 3 shows a schematic cross-sectional view of the bonding element of FIG. 2 taken along line AA.
Figure 4:
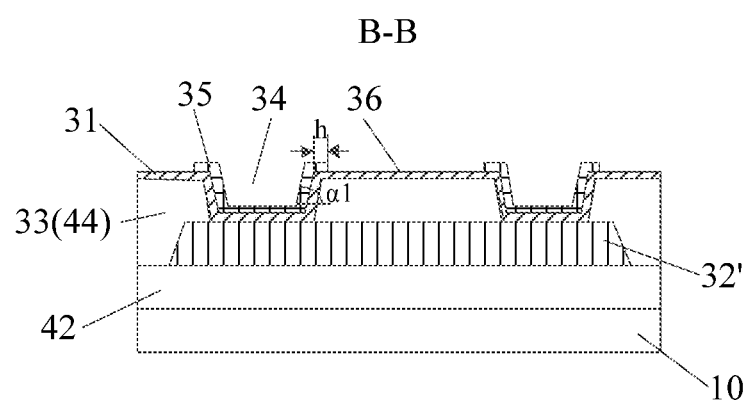
FIG. 4 shows a schematic cross-sectional view of the bonding element of FIG. 2 taken along line BB.

FIG. 3 and FIG. 4 show two different embodiments of the bonding elements 21 respectively. In the embodiment shown in FIG. 3, the second conductive layer 32 and the source and drain layer 43 in the display region AA are formed of the same material and formed by the same process. In the display substrate, the material of the second conductive layer 32 is the same as the material of the source and drain layer 43 in the display region AA. In the embodiment shown in FIG. 4, the second conductive layer 32' and the gate layer 41 in the display region AA are formed of the same material and formed by the same process. In the display substrate, the material of the second conductive layer 32 is the same as the material of the gate layer 41 in the display region AA. In some embodiments of the present disclosure, the at least one bonding element 21 includes a first set of bonding elements 211 and a second set of bonding elements 212. In the first set of bonding elements 211, the second conductive layer 32' and the source and drain layer 43 in the display region AA are formed of the same material and formed by the same process. In the second set of bonding elements 212, the second conductive layer 32 and the gate layer 41 in the display region AA are formed of the same material and formed by the same process. In other words, in the first set of bonding elements 211, the material of the second conductive layer 32' is the same as the material of the source and drain layer 43 in the display region AA. In the second set of bonding elements 212, the material of the second conductive layer 32 is the same as the material of the gate layer 41 in the display region AA. As an example, the first set of bonding elements 211 and the second set of bonding elements 212 are alternately arranged in the peripheral region P. By adopting the structure in which the first set of bonding elements 211 and the second set of bonding elements 212 are alternately arranged, it is possible to prevent the second conductive layers 32 and 32' in adjacent bonding elements 21 from being located in different layers, thereby improving wiring density and saving wiring space. This is also beneficial for reducing a space between adjacent bonding elements.

In some embodiments of the present disclosure, as shown in FIG. 3 and FIG. 4, a slope angle α1 of the via hole in the first set of bonding elements 211 is large than a slope angle α2 of the via hole in the second set of bonding elements 212. This is because the second conductive layer 32' in the first set of bonding elements 211 is closer to the non-covered surface 36 of the first conductive layer 31 and more far away from the base substrate 10, as compared with that in the second set of bonding elements 212. As shown in FIG. 3, when the second conductive layer 32 and the gate layer 41 are formed of the same material and formed by the same process, the insulation layer 33 between the second conductive layer 32 and the first conductive layer 31 includes at least a passivation layer 44 and a gate insulation layer 42 in a region except the via hole(s). In contrast, as shown in FIG. 4, when the second conductive layer 32' and the source and drain layer 43 are formed of the same material and formed by the same process, the insulation layer 33 between the second conductive layer 32' and the first conductive layer 31 includes at least a passivation layer 44 without the gate insulation layer 42 in the region except the via hole(s). This results in a difference between the slope angle α1 of the via hole in the first set of bonding elements 211 and the slope angle α2 of the via hole in the second set of bonding elements 212. As an example, the slope angle α1 of the via hole in the first set of bonding elements 211 is in a range of 20 degrees to 80 degrees, and the slope angle α2 of the via hole in the second set of bonding elements 212 is in a range of 10 degrees to 60 degrees.

Figure 5:
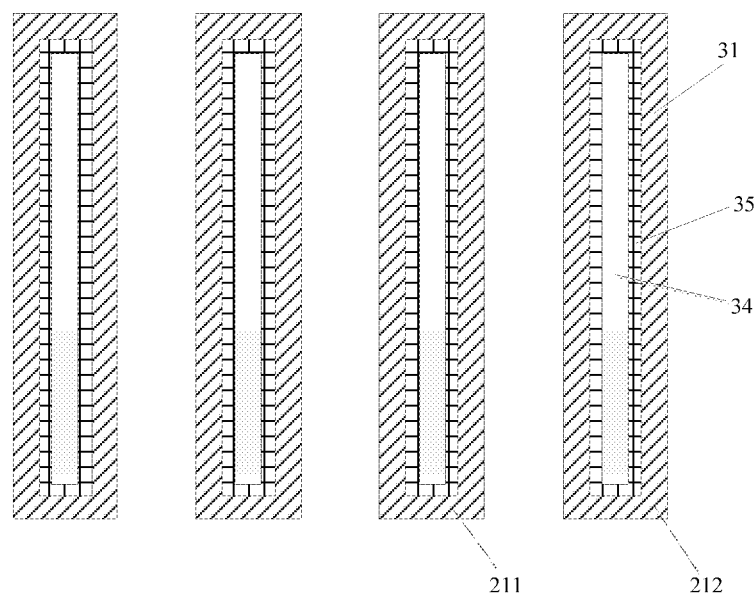
FIG. 5 shows a schematic top view of the bonding element in a peripheral region of the display substrate according to some other embodiments of the present disclosure.

In some embodiments of the present disclosure, as shown in FIG. 2, an orthographic projection of the via hole 34 of the bonding element 21 on the base substrate 10 has a circular shape. A plurality of via holes 34 may be provided in one bonding element 21. In some other embodiments of the present disclosure, as shown in FIG. 5, an orthographic projection of the via hole 34 of the bonding element 21 on the base substrate 10 has a long strip shape. A single via hole 34 may be provided in one bonding element 21. In the embodiment shown in FIG. 2, a diameter of the via hole 34 (which for example may be measured at a half height) may be, for example, several micrometers to tens of micrometers. In the embodiment shown in FIG. 5, a width of the via hole 34 (which for example may be measured at a half height) may be, for example, several micrometers to tens of micrometers, such as about 10 μm. The embodiments of the present disclosure are not limited thereto, for example, the via hole 34 may have other shapes, and the number of the via holes 34 in each bonding element 21 may be set as desired in practice.

In some embodiments of the present disclosure, an orthographic projection of the via hole 34 on the base substrate 10 falls within an orthographic projection of the via hole protection layer 35 on the base substrate 10. This may ensure that the via hole 34 is well covered by the via hole protection layer 35. A minimum distance h between an outer edge of the orthographic projection of the via hole 34 on the base substrate 10 and an outer edge of the orthographic projection of the via hole protection layer 35 on the base substrate 10 is, for example, less than 15 μm, such as less than 3 μm or 2 μm.

In some embodiments of the present disclosure, in a same bonding element, an area of the orthographic projection of the via hole protection layer 35 on the base substrate 10 is less than an area of the orthographic projection of the non-covered surface 36 of the first conductive layer 31 on the base substrate 10. Since the non-covered surface 36 may be used as the contact surface to be electrically connected to the external component, the first conductive layer 31 may have a contact surface that is sufficient to be electrically connected to the external component, thereby ensuring the stability of the signal.

In some embodiments of the present disclosure, an organic film layer 47 may be further disposed on the display region AA. As shown in FIG. 7, the organic film layer 47 is located on a side of the source and drain layer 43 away from the base substrate 10, and on a side of the passivation layer 44 away from the base substrate 10. A thickness of the organic film layer 47 may be greater than a thickness of the passivation layer 44. The organic film layer 47 may increase a distance between the pixel electrode layer 45 and the gate layer 41 and a distance between the pixel electrode layer 45 and the source and drain layers 43, so as to reduce a parasitic capacitance between the pixel electrode layer 45 and other conductive layers. As an example, the organic film layer 47 may be formed of a photoresist-like material. In some embodiments of the present disclosure, the display region AA may further include an active layer 48. The active layer 48 is located on a side of the gate insulation layer 42 away from the base substrate 10 and on a side of the source and drain layers 43 facing to the base substrate 10. The gate layer 41, the active layer 48 and the source and drain layer 43 described above may form a thin film transistor structure. A connection via hole 49 are shown in both FIG. 6 and FIG. 7. The connection via hole 49 penetrates through the organic film layer 47 and the passivation layer 44 such that the pixel electrode layer 45 is electrically connected to the source and drain layer 43 (usually the drain) through the via hole 49, thereby realizing the control of the sub-pixel display by the thin film transistor.

Figure 6:
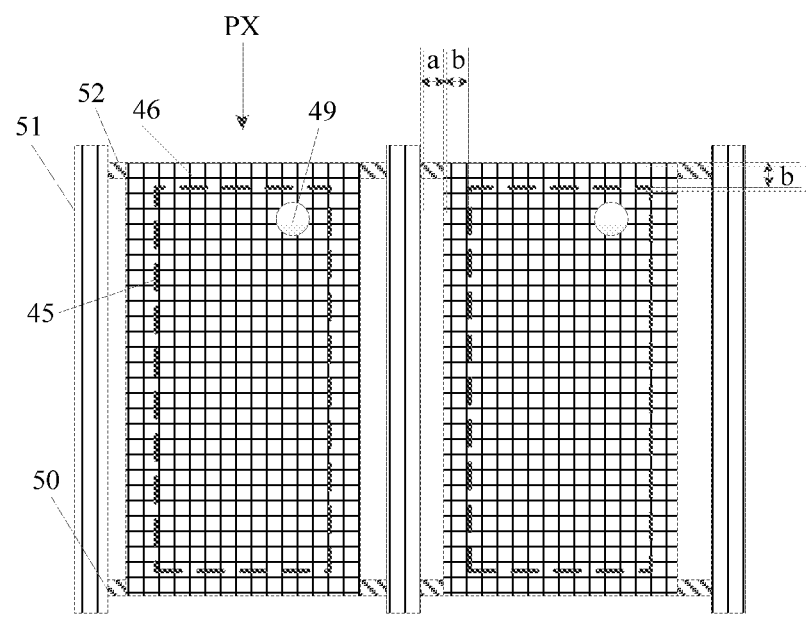
FIG. 6 shows a schematic diagram of a sub-pixel unit in the display substrate according to some embodiments of the present disclosure.

In some embodiments of the present disclosure, as shown in FIG. 6, a plurality of sub-pixel units PX are provided in the display region AA. An orthographic projection of the pixel electrode layer 45 in each sub-pixel unit PX on the base substrate 10 has a block shape. In a same sub-pixel unit of the display region AA, a minimum distance b between an edge of the orthographic projection of the reflection electrode 46 on the base substrate 10 and an edge of the orthographic projection of the pixel electrode layer 45 on the base substrate 10 is less than 10 μm. This design allows the pixel electrode layer 45 to have an area as large as possible, so as to avoid the yield of the products to be affected by a residual sand defect that is possibly occurred in the pixel electrode layer 45 during the etching.

In some embodiments, a plurality of data lines 51 and a plurality of gate lines 52 are provided in the display region AA. The plurality of data lines 51 intersect with the plurality of gate lines 52. A distance between the orthographic projection of the edge of the reflection electrode 46 in the sub-pixel unit PX in the display region AA on the base substrate 10 and the orthographic projection of the data line 51 closest to the reflection electrode on the base substrate 10 is less than 8 μm. Accordingly, the reflection electrode 46 may have an area as large as possible, while a generation of parasitic capacitance between the data line 51 and the reflection electrode 46 may be avoided. FIG. 6 only shows a part of the pixels in one row. In FIG. 6, the gate line 52 overlaps with the reflection electrode 46 at an upper part of the sub-pixel, and a common electrode line 50 overlaps with the reflection electrode 46 at a lower part of the sub-pixel. The common electrode and the pixel electrode layer 45 together apply voltage to the liquid crystal layer. The common electrode, for example, may be located on an opposite substrate (e.g., a color filter substrate) of the display substrate (e.g., an array substrate). However, in order to increase the area of the common electrode on the circuit board to improve signal stability, a common electrode line 50 may be provided on the display substrate (e.g., an array substrate), and the common electrode line 50 on the display substrate is electrically connected to the common electrode line on the opposite substrate (e.g., a color filter substrate). For example, the common electrode line and the gate layer 41 may be formed of the same material and formed by the same process. In other words, the material of the common electrode line 50 is the same as the material of the gate layer 41.

In some embodiments, the via hole has a circular shape; the via hole protection layer has a circular shape; the via hole protection layer and the via hole are not concentric circles. It may reduce a difficulty of the process.

In some embodiments, the display substrate is a reflective display substrate. A display region of the display substrate includes a pixel electrode, a metal reflection electrode located on the pixel electrode and a transistor located in the display region. The transistor includes a gate, a gate insulation layer, and a source and a drain.

The second conductive layer in the peripheral region includes a gate lead for the gate and a source lead for the source.

The first conductive layer in the peripheral region includes a transparent metal oxide layer. A material of the transparent metal oxide layer is the same as a material of the pixel electrode. The transparent metal oxide layer is formed by the same process as the pixel electrode.

The insulation layer disposed between the transparent metal oxide layer and the gate lead or the source lead includes the gate insulation layer. The via hole is disposed on the gate insulation layer. The gate lead or the source lead is connected to the transparent metal oxide layer through the via hole.

The gate lead or the source lead is a metal lead.

A metal via hole protection layer having the same material as the metal reflection electrode is formed by the transparent metal oxide layer in the bonding element region, corresponding to a region where the via hole of the gate insulation layer is located.

In some embodiments, the base substrate may be a glass substrate, or a substrate made of other materials (e.g., plastic, resin, etc.).

Figure 8:
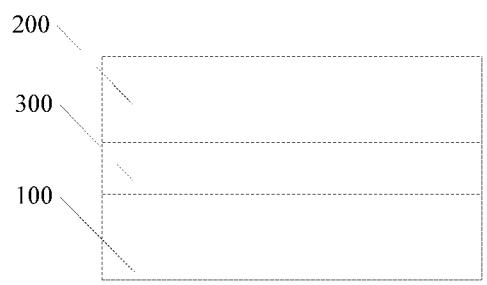
FIG. 8 shows a schematic diagram of a reflective liquid crystal display panel according to some embodiments of the present disclosure.

As shown in FIG. 8, an embodiment of the present disclosure further provides a reflective liquid crystal display panel 1000. The reflective liquid crystal display panel 1000 may include the display substrate 100 described in any of the embodiments aforementioned, and may further include an opposite substrate (e.g., a color filter substrate) 200 and a liquid crystal layer 300 located between the display substrate 100 and the opposite substrate 200. The reflective liquid crystal display panel 1000 may be used in any display apparatus, such as a smart phone, a tablet computer, a television, a monitor, a notebook computer, a digital photo frame, a navigator, a car monitor, an e-book, and so on. The embodiments of the present disclosure further provide an electronic apparatus, which may include the display substrate 100 or the reflective liquid crystal display panel 1000 described in any of the embodiments aforementioned. The electronic apparatus may be any display apparatus, such as a smart phone, a tablet computer, a TV, a monitor, a notebook computer, a digital photo frame, a navigator, a car monitor, an e-book, and so on.

The embodiments of the present disclosure further provide a method of manufacturing a display substrate, including the following steps.

At step S10, at least one bonding element to be electrically connected to an external component is formed in the peripheral region on the base substrate. The bonding element includes a first conductive layer, a second conductive layer located between the first conductive layer and the base substrate, and an insulation layer between the second conductive layer and the first conductive layer. The first conductive layer includes a metal oxide conductive lead. The second conductive layer includes a metal conductive lead. One or more via holes are provided in a region corresponding to at least one metal oxide conductive lead on the insulation layer. The at least one metal oxide conductive lead includes a part located on the insulation layer in contact with the insulation layer and a part extending into the via hole in the insulation layer. The metal conductive lead and the metal oxide conductive lead are connected in one-to-one correspondence. The metal conductive lead is electrically connected to the metal oxide conductive lead through the one or more via holes. The bonding element further includes a via hole protection layer. The via hole protection layer is disposed on a region corresponding to the via hole on the metal oxide conductive lead.

Figure 9:
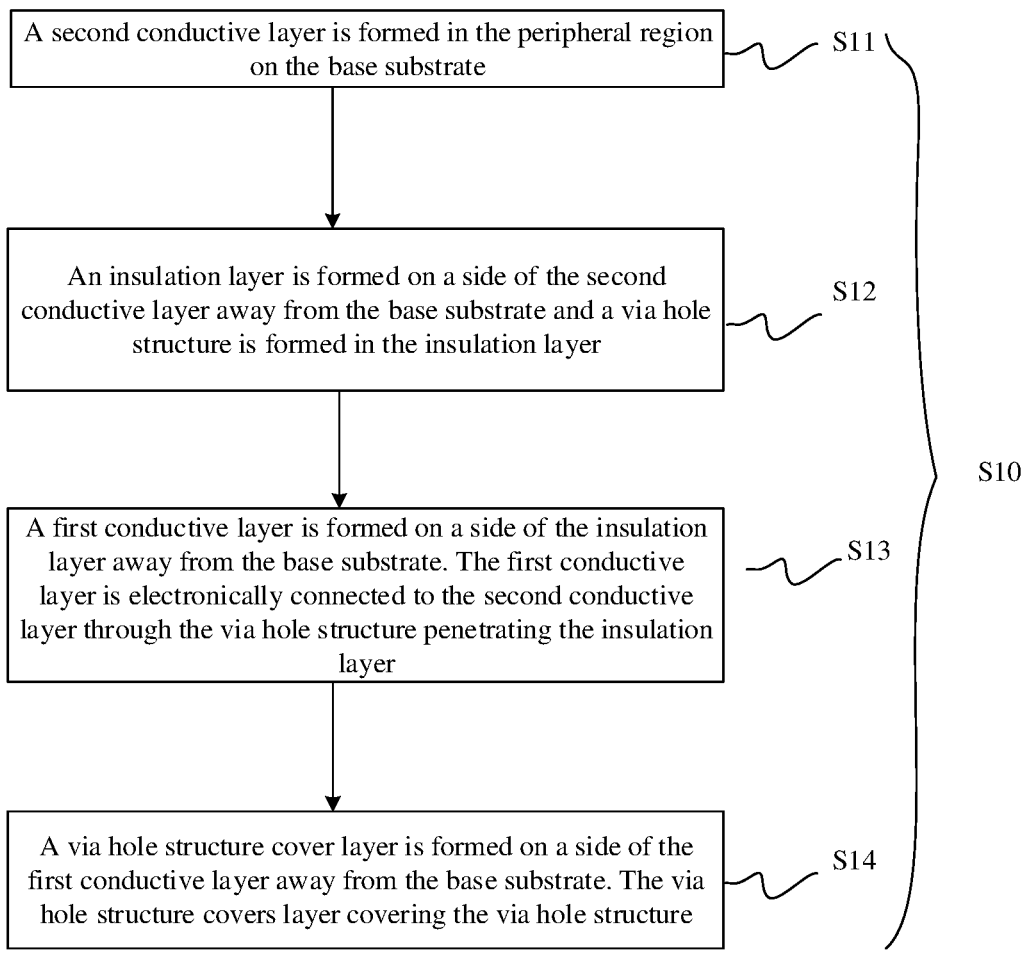
FIG. 9 shows a schematic flow chart of a method for manufacturing the bonding element of the reflective liquid crystal display panel according to some embodiments of the present disclosure.

In some embodiments, as shown in FIG. 9, forming at least one bonding element electrically connected to the external component in the peripheral region on the base substrate described above includes the following steps.

At step S11, a second conductive layer is formed in the peripheral region on the base substrate.

At step S12, an insulation layer is formed on a side of the second conductive layer away from the base substrate and a via hole is formed in the insulation layer.

At step S13, a first conductive layer is formed on a side of the insulation layer away from the base substrate. The first conductive layer is electrically connected to the second conductive layer through the via hole penetrating the insulation layer.

At step S14, a via hole protection layer is formed on a side of the first conductive layer away from the base substrate. The via hole protection layer covers the via hole.

Figure 10:
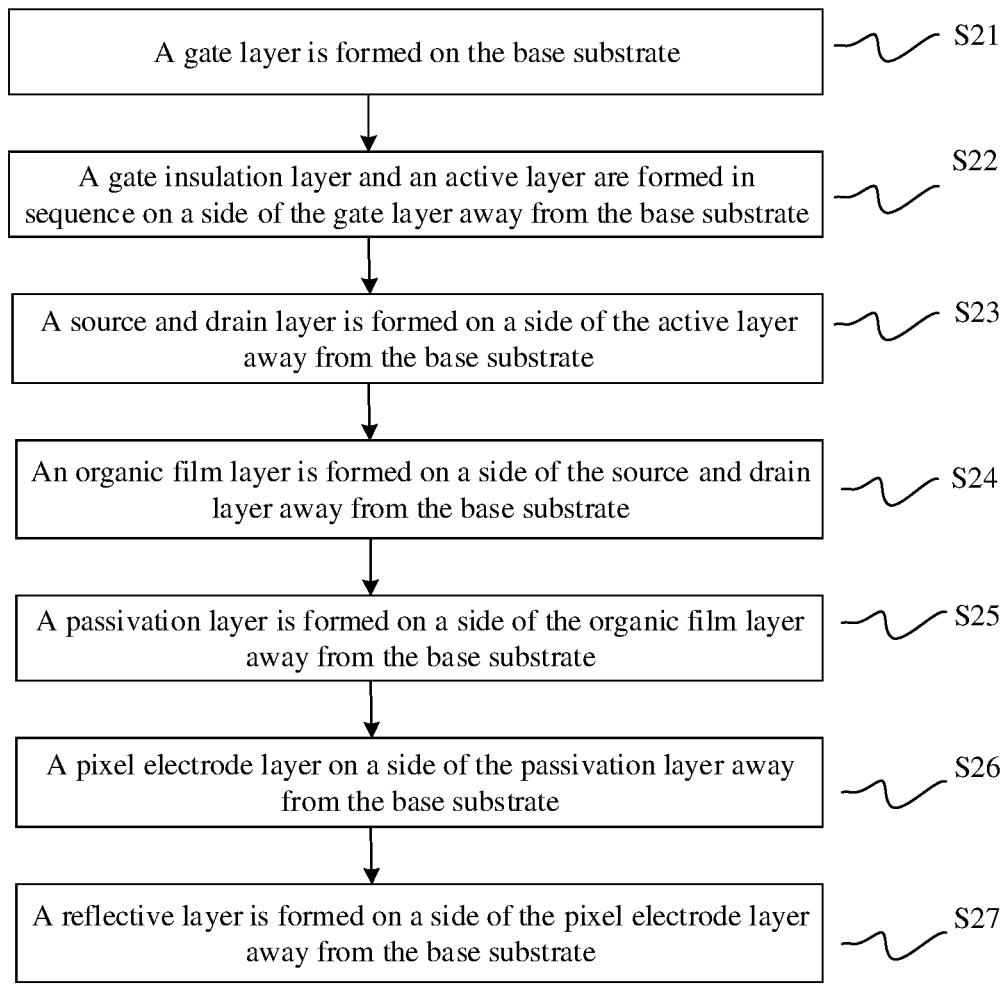
FIG. 10 shows a schematic flow chart of a method for manufacturing a layer structure in a display region of a reflective liquid crystal display panel according to other embodiments of the present disclosure.

FIG. 10 shows an example of steps of manufacturing the layer structure in the display region of the base substrate, which specifically include the following steps.

At step S21, a gate layer is formed on the base substrate.

At step S22, a gate insulation layer and an active layer are formed in sequence on a side of the gate layer away from the base substrate.

At step S23, a source and drain layer is formed on a side of the active layer away from the base substrate.

At step S24, an organic film layer is formed on a side of the source and drain layer away from the base substrate.

At step S25, a passivation layer is formed on a side of the organic film layer away from the base substrate.

At step S26, a pixel electrode layer is formed on a side of the passivation layer away from the base substrate.

At step S27, a reflection electrode is formed on a side of the pixel electrode layer away from the base substrate.

In order to simplify the process, the steps of forming the bonding element in the peripheral region shown in FIG. 9 may be performed together with the steps of forming the layer structure of the display region shown in FIG. 10. In some embodiments, the material of the second conductive layer is the same as the material of the gate layer, and the second conductive layer is formed by the same process as the gate layer That is, the step S11 and step S21 mentioned above may be performed concurrently and thus combined into one step. In other embodiments, the material of the second conductive layer is the same as the material of the source and drain layer, and the second conductive layer is formed by the same process as the source and drain layer. That is, the step S11 and step S23 mentioned above may be performed concurrently and thus combined into one step. For another example, the material of the first conductive layer is the same as the material of the pixel electrode layer, and the first conductive layer is formed by the same process as the pixel electrode layer. That is, the step S13 and step S26 mentioned above may be performed concurrently and thus combined into one step. As another example, the material of the via hole protection layer is the same as the material of the reflective electrode. That is, the step S14 and step S27 mentioned above may be performed concurrently and thus combined into one step. In step S14, as an example, by patterning a part of the bonding element 21 that is covered by the metal layer disposed in the same layer as the reflection electrode 46, the part of the metal layer covering the via hole is reserved to form the via hole protection layer 35, and most part of the metal layer covering the conductive layer 31 may be removed, thereby ensuring a stable and reliable electrical contact between the bonding element 21 and the external component.

However, those skilled in the art should understand that the method of manufacturing the display substrate shown in FIG. 10 is only an example. In this example, the thin film transistor TFT1 in the display region has a bottom-gate type structure. However, the embodiments of the present disclosure are not limited thereto. For example, the thin film transistor TFT1 may have a top-gate type structure. In case that a thin film transistor having the top-gate type structure is provided in the display substrate, the gate layer is formed after the source and drain layer are formed. Specific manufacturing steps of the thin film transistor with the top-gate type structure are known to those skilled in the art and will not be repeated here.

It can be seen from the above, according to the display substrate of the embodiments of the present disclosure, any of the steps of forming the layer structure of the bonding element may be incorporated into the steps of forming the layer structure of the display region, without the need of adding new process steps.

In some embodiments, as described above, the at least one bonding element 21 includes a first set of bonding elements 211 and a second set of bonding elements 212. The material of the second conductive layer 32 in the first set of bonding elements 211 is the same as the material of the source and drain layer 43 in the display region, and the second conductive layer 32 in the first set of bonding elements 211 is formed by the same process as the source and drain layer 43 in the display region. The material of the second conductive layer 32 in the second set of bonding elements 212 is the same as the material of the gate layer 41 in the display region, and the second conductive layer 32 in the second set of bonding elements 212 is formed by the same process as the gate layer 41 in the display region. The first set of bonding elements 211 and the second set of bonding elements 212 are alternately arranged in the peripheral region.

The embodiments of the present disclosure further provide an electronic apparatus, including any of the transparent display panels 100, 100', 100" according to the preceding embodiments. For example, the electronic apparatus may be any display apparatus, such as a smart phone, a wearable smart watch, smart glasses, a tablet computer, a TV, a monitor, a notebook computer, a digital photo frame, a navigator, a car monitor, an e-book, etc.

Although the present disclosure is described with reference to the accompanying drawings, the embodiments disclosed in the accompanying drawings are intended to illustrate the embodiments of the present disclosure and should not be construed as a limitation of the present disclosure. The size and the ratios in the drawings are only schematic, and should not be construed as limiting the present disclosure.

The above embodiments are only illustrative of the principles and structures of the present disclosure, but are not intended to limit the present disclosure. Those skilled in the art should understand that any change to the present disclosure may be made without departing from the general concept of the present disclosure, and any improvement are within the scope of this disclosure. The protection scope of the present disclosure should be determined by the scope defined by the claims of the present application.

What is claimed is:

1. A display substrate, comprising:
    a base substrate, the base substrate comprising a display region and a peripheral region surrounding the display region, wherein at least one bonding element configured to be electrically connected to an external component is disposed in the peripheral region, the bonding element comprises a first conductive layer, and the first conductive layer comprises a metal oxide conductive lead;
    the bonding element further comprises a second conductive layer located between the first conductive layer and the base substrate, and the second conductive layer comprises a metal conductive lead;
    the bonding element further comprises an insulation layer located between the second conductive layer and the first conductive layer, wherein a plurality of via holes are provided in a region of the insulation layer corresponding to at least one metal oxide conductive lead, the at least one metal oxide conductive lead comprises a part located on the insulation layer in contact with the insulation layer and a part extending into the via hole in the insulation layer;
    the metal conductive lead and the metal oxide conductive lead are connected in one-to-one correspondence, and the metal conductive lead is electrically connected to the metal oxide conductive lead through the plurality of via holes;
    the bonding element further comprises a via hole protection layer disposed on a region of the metal oxide conductive lead corresponding to the via holes,
    wherein in a same bonding element, an area of an orthographic projection of the via hole protection layer on the base substrate is less than an area of an orthographic projection of a surface, which is not covered by the via hole protection layer and is between adjacent via holes provided with the via hole protection layer, of the first conductive layer on the base substrate; and
    wherein the via hole protection layer comprises at least one metal layer, the display substrate further comprises a reflection electrode located in the display region, a material of the reflection electrode is the same as a material of the at least one metal layer, and the via hole protection layer disposed in a same layer as the reflection electrode.

2. The display substrate of claim 1, wherein the surface, which is not covered by the via hole protection layer, of the first conductive layer is a contact surface to be electrically connected to the external component.

3. The display substrate of claim 1, wherein the at least one metal layer is a metal double layer, the metal double layer comprises a metal adhesion layer and a metal reflection layer which are laminated, and the metal reflection layer is used for reflection.

4. The display substrate of claim 1, wherein a plurality of sub-pixel units are disposed in the display region, a pixel electrode layer is disposed in each sub-pixel unit, the pixel electrode layer is disposed on a side of the reflection electrode facing to the base substrate and is electrically connected to the pixel electrode, an orthographic projection of the pixel electrode layer on the base substrate has a block shape, and in a same sub-pixel unit in the display region, a minimum distance between an edge of an orthographic projection of the reflection electrode on the base substrate and an edge of an orthographic projection of the pixel electrode layer on the base substrate is less than 10 μm.

5. The display substrate of claim 4, wherein a plurality of data lines and a plurality of gate lines are disposed in the display region, the plurality of data lines intersect with the plurality of gate lines, a distance between an orthographic projection of an edge of the reflection electrode in the sub-pixel unit in the display region on the base substrate and an orthographic projection of the data line closest to the reflection electrode on the base substrate is less than 8 μm.

6. The display substrate of claim 1, wherein an orthographic projection of the via hole on the base substrate falls within an orthographic projection of the via hole protection layer on the base substrate, and a minimum distance between an outer edge of the orthographic projection of the via hole on the base substrate and an outer edge of the orthographic projection of the via hole protection layer on the base substrate is less than 15 μm.

7. The display substrate of claim 1, wherein a gate layer and a source and drain layer are disposed in the display region, the gate layer comprises a gate of a thin film transistor, the source and drain layer comprises a source of the thin film transistor and a drain of the thin film transistor, and a material of the second conductive layer is the same as a material of the source and drain layer in the display region or a material of the gate layer in the display region.

8. The display substrate of claim 1, wherein a gate layer and a source and drain layer are disposed in the display region, the gate layer comprises a gate of a thin film transistor, the source and drain layer comprises a source of the thin film transistor and a drain of the thin film transistor, the at least one bonding element comprises a first set of bonding elements in which a material of the second conductive layer is the same as a material of the source and drain layer in the display region, and a second set of bonding elements in which the material of the second conductive layer is the same as a material of the gate layer in the display region, and the first set of bonding elements and the second set of bonding elements are alternately arranged in the peripheral region.

9. The display substrate of claim 8, wherein a slope angle of the via hole in the first set of bounding elements is larger than a slope angle of the via hole in the second set of bonding elements.

10. The display substrate of claim 9, wherein the slope angle of the via hole in the first set of bonding elements is in a range of 20 degrees to 80 degrees, and the slope angle of the via hole in the second set of bonding elements is in a range of 10 degrees to 60 degrees.

11. The display substrate of claim 1, wherein the via hole has a circular shape, and the via hole protection layer has a circular shape; and the via hole protection layer and the via hole are not concentric circles.

12. An electronic apparatus comprising a display substrate of claim 1.

13. The electronic apparatus of claim 12, wherein in a same bonding element, an area of an orthographic projection of the via hole protection layer on the base substrate is less than an area of an orthographic projection of a surface, which is not covered by the via hole protection layer, of the first conductive layer on the base substrate, and the surface, which is not covered by the via hole protection layer, of the first conductive layer is a contact surface to be electrically connected to the external component.

14. The electronic apparatus of claim 12, wherein the via hole protection layer comprises at least one metal layer, the display substrate further comprises a reflection electrode located in the display region, and a material of the reflection electrode is the same as a material of the at least one metal layer.

15. The electronic apparatus of claim 14, wherein the at least one metal layer is a metal double layer, the metal double layer comprises a metal adhesion layer and a metal reflection layer which are laminated, and the metal reflection layer is used for reflection.

16. The electronic apparatus of claim 14, wherein a plurality of sub-pixel units are disposed in the display region, a pixel electrode layer is disposed in each sub-pixel unit, the pixel electrode layer is disposed on a side of the reflection electrode facing to the base substrate and is electrically connected to the pixel electrode, an orthographic projection of the pixel electrode layer on the base substrate has a block shape, and in a same sub-pixel unit in the display region, a minimum distance between an edge of an orthographic projection of the reflection electrode on the base substrate and an edge of an orthographic projection of the pixel electrode layer on the base substrate is less than 10 μm.

17. The electronic apparatus of claim 16, wherein a plurality of data lines and a plurality of gate lines are disposed in the display region, the plurality of data lines intersect with the plurality of gate lines, a distance between an orthographic projection of an edge of the reflection electrode in the sub-pixel unit in the display region on the base substrate and an orthographic projection of the data line closest to the reflection electrode on the base substrate is less than 8 μm.

18. The electronic apparatus of claim 12, wherein an orthographic projection of the via hole on the base substrate falls within an orthographic projection of the via hole protection layer on the base substrate, and a minimum distance between an outer edge of the orthographic projection of the via hole on the base substrate and an outer edge of the orthographic projection of the via hole protection layer on the base substrate is less than 15 μm.

* * * * *